United States Patent Office 3,044,972
Patented July 17, 1962

3,044,972
THERMOPLASTIC COMPOSITION COMPRISING A STYRENE POLYMER AND A GRAFT COPOLYMER
Nicholas R. Segro, Glenbrook, and William Hodes, Stamford, Conn., assignors to American Cyanamid Company, New York, N.Y., a corporation of Maine
No Drawing. Filed Mar. 11, 1959, Ser. No. 798,605
10 Claims. (Cl. 260—17)

This invention relates to thermoplastic resinous compositions prepared from a hard resinous vinyl aromatic polymer and a rubbery graft copolymer comprising essentially an alkyl acrylate ester polymerized on a backbone of a pre-formed polyol. More particularly, this invention relates to a thermoplastic resinous composition prepared by blending (I) the polymerization product of a vinyl aromatic compound represented by the general formula

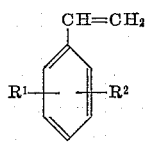

wherein $R^1$ and $R^2$ are selected from the group consisting of hydrogen, lower alkyl substituents of 1 to 4 carbon atoms, chlorine, bromine, alkoxy radicals of 1 to 3 carbon atoms, cyano radicals and halo alkyl radicals, and to copolymers thereof with an acrylonitrile, and (II) a copolymer formed by grafting an acrylate selected from the group consisting of ethyl acrylate and n-butyl acrylate onto a backbone of a material comprising polyol compounds. This invention also relates to the preparation of these compositions and to articles produced therefrom.

Vinyl aromatic polymers and copolymers of the type of the general formula, e.g., polystyrene, polymethylstyrene, polydimethylstyrene and copolymers of styrene or methylstyrene with acrylonitrile are known in the art. These resinous compositions find many uses in the production of articles formed by compression molding, injection molding, extrusion and the like. It is also known that the mechanical properties of these compounds can be improved by incorporating therein a small amount of various elastomeric modifiers, including polyethyl acrylate or styrene copolymers. To the best of our knowledge, however, compositions employing a rubbery acrylate graft copolymer as the resin modifying component and the advantages of so modifying blends of thermoplastic material have not been known heretofore.

In general, blends of thermoplastic resins and rubbery polymers result in products of improved toughness only when the magnitude of interchain binding forces in resin and rubber are rather closely matched or when some specific interaction is possible between groups in the resin and rubber molecules. We have found according to the invention that graft copolymers of ethyl acrylate or n-butyl acrylate on backbones of a pre-formed polyol effectively reinforce polymers of styrene compounds of the foregoing formula.

Various methods may be employed to incorporate the graft copolymer containing the rubbery polymer into the hard, non-elastomeric styrene type polymer. Perhaps the best known method is by mechanically working or masticating on heated compounding rolls the ingredients of the mixture, thereby forming a homogeneous mass that is suitable for utilization as a molding or extrusion compound. At the same time, various modifiers, stabilizers, plasticizers and the like may be incorporated into the mixture in order to improve certain physical properties of the composition.

It is an object of our invention to prepare a polymeric molding composition comprising essentially a thermoplastic resin blended with a rubbery graft copolymer of an alkyl acrylate ester on a pre-formed polyol having improved impact strength and high heat distortion temperature. Other objects and advantages of our invention will be apparent from the discussion and examples which describe the invention more fully hereinbelow.

The hard resinous polymer employed in our invention may be prepared by conventionally polymerizing or copolymerizing a compound represented by the general formula

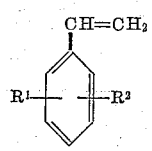

wherein $R^1$ and $R^2$ are substituents as above described, and acrylonitrile. In copolymerizations, at least 60% of the combined monomeric ingredients should be compounds of this general formula. When an acrylonitrile is the comonomer chemically combined with the vinyl aromatic of this formula, it is generally present in amounts not exceeding 40% by weight, and preferably the combined acrylonitrile is present in amounts of from about 7 to about 35% by weight based on the weight of the copolymer.

As noted above, any of the known procedures for preparing the hard resinous polymer may be used. Illustrative procedures are the techniques disclosed in U.S. Patent 2,745,824 and in the pending application of J. A. Melchore, Serial No. 575,164, now United States Patent No. 2,931,793.

The rubbery copolymer (II) utilized in the invention comprises essentially an alkyl acrylate of the group consisting of ethyl acrylate and n-butyl acrylate grafted on a pre-formed polyol wherein the latter is present in minor proportions generally not in excess of about 20% by weight of the graft copolymer.

Compounds contemplated by the term "pre-formed polyols" are such as polyvinyl alcohol and derivatives of polyvinyl alcohol and the polysaccharides and derivatives thereof, i.e., the naturally occurring polymers of anhydroglucose, for example. The polyols used as backbone for the preparation of the elastomeric graft copolymer include such as polyvinyl alcohol, partial esters of polyvinyl alcohol, as for example, formylated polyvinyl alcohol, acetylated polyvinyl alcohol, sulfated polyvinyl alcohol, nitrated polyvinyl alcohol, and the like; partial ethers of polyvinyl alcohol as cyanoethylated polyvinyl alcohol, cellulose, including cotton, viscose, cuprammonium rayon, partial esters of cellulose such as cellulose acetate, cellulose propionate, cellulose nitrate and the like; partial ethers of cellulose such as methyl cellulose, ethyl cellulose, hydroxy ethyl cellulose, carboxy methyl cellulose, cyanoethylated cellulose and the like; starch or amylose (a purified whole fraction of starch), partial ethers of starch, as for example, cyanoethylated starch; partial esters of starch, as for example, acetylated starch, and the like. The respective weight ratios of the backbone material to acrylate monomer should be maintained between about 2:98 to about 20:80, preferably 5:95. Graft copolymers of this type may be prepared according to the procedure described in U.S. Patent application, Serial No. 628,212, now abandoned.

The hard resinous polymer and the rubbery graft copolymer are preferably homogeneously blended on a standard two-roll mill. The temperature at which the two components of the composition are blended may be varied between about 250° F. and 360° F., depending on the softening point of the materials blended. The hard resinous polymer is preferably added first to the rolls and, when this material has banded, the rubbery graft copolymer is then added gradually until a homogeneous blend is obtained. The blending time is generally within the order of from about 3 to 20 minutes.

During the blending operation, additives such as lubricants, plasticizers, antioxidants, light stabilizers, colorants, curing agents and the like may be mixed with the other components on the mill and distributed homogeneously throughout the blend.

The hard resinous polymer blended with the rubbery graft copolymer may be employed in the production of molded articles where previously polymers of styrene type compounds have been employed. By employing the molding composition possessing greater impact strength, as is produced herein according to the invention, articles having more attractive properties such as greater physical resistance to breakage, shock and impact are obtained.

The following examples in which all parts are parts by weight unless specifically noted otherwise will further illustrate the inventive concept, it being understood, however, that the invention is not to be limited to the specific amounts recited in the examples.

EXAMPLE 1

*Illustrative Procedure for Preparation of Graft Polymer Materials*

(a) 1620 parts distilled water
(b) 80 parts Arquad 18 solution [1]
(c) 200 parts ethyl acrylate [2]
(d) 9.68 parts hydroxyethyl cellulose [3]
(e) 100 parts $Ce^{IV}$ sol. (0.1 M $Ce(NH_4)_2(NO_3)_6$, 1 M $HNO_3$)

PROCEDURE (a) An emulsion of (a), (b), (c) and (d) is stirred and purged with $CO_2$ for 30 minutes at 25° C. in a 3-liter, 3-neck, round-bottom flask equipped with thermometer, dropping funnel, gassing tube and agitator ($CO_2$ rate=400 ml./min.)

(e) is added (pH 1.0–1.5) and the system stirred and purged as before for an additional 60 minutes while maintaining a temperature of 25° C.

(b) The resultant ethyl acrylate graft copolymer is recovered in a conventional manner by coagulation, washing and drying.

[1] Aqueous solution of octadecyl trimethyl ammonium chloride, 1.995 parts/100 parts of water.
[2] Washed with 5% NaOH and demineralized water before use.
[3] Dried to constant weight under vacuum at 60° C.

In a like manner, graft copolymers of n-butyl acrylate or n-butyl acrylate-acrylonitrile with hydroxyethyl cellulose or other backbone materials may be prepared. The preparation of the graft copolymers as such is not within the contemplation of the present invention.

EXAMPLES 2–14

The following examples, including control and comparative runs, for which results are summarized in Table I, are obtained by milling the vinyl aromatic resinous polymer and graft copolymer for 15 minutes on a 6″ x 13″ two-roll mill with both rolls at a temperature of 330° F. The milled material in the form of homogeneously blended composition was granulated and injection molded into ¼″ x ¼″ x 5″ test bars and examined for impact strength and heat distortion temperature.

TABLE I

| Example | Control | Control | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CYMAC 400 [1] | 100 | | 80 | 70 | 60 | 50 | | | 80 | 70 | | | 70 | | 70 |
| CYMAC 201 [2] | | 100 | | | | | 80 | 70 | | | 70 | 70 | | 70 | |
| Ethyl acrylate graft copolymer [3] | | | 20 | 30 | 40 | 50 | 20 | 30 | | | | | | | |
| Butyl acrylate graft copolymer [3] | | | | | | | | | 20 | 30 | | | | | |
| Butyl acrylate-acrylonitrile graft copolymer [3] | | | | | | | | | | | [5] 30 | [6] 30 | | | |
| Ethyl acrylate homopolymer [4] | | | | | | | | | | | | | 30 | 30 | |
| Butyl acrylate homopolymer [4] | | | | | | | | | | | | | | | 30 |
| Properties: | | | | | | | | | | | | | | | |
| Dozi impact, ft. lbs./in. notch—¼″ x ½″ x 5″ | 0.22 | 0.26 | 0.32 | 0.45 | 0.69 | 1.4 | 0.39 | 1.2 | 0.49 | 1.2 | 2.0 | 0.87 | 0.46 | 0.55 | 0.60 |
| Heat distortion 264 p.s.i. ° C. ¼″ x ½″ x 5″ | 96 | 100 | 95 | 95 | 92 | 79 | 94 | 93 | 96 | 95 | 81 | 88 | 89 | 82 | 89 |

[1] Polymethylstyrene.
[2] 70/30 methylstyrene/acrylonitrile copolymer.
[3] Graft copolymers of ethyl acrylate, n-butyl acrylate or n-butyl acrylate-acrylonitrile, 95 parts, on hydroxyethyl cellulose, 5 parts.
[4] Homopolymers prepared according to the procedure in "Monomeric Acrylic Esters," E. H. Riddle, Reinhold Publishing Corp. (1954), page 53. The homopolymers were recovered by coagulation, washing and drying in the usual way.
[5] 90/10 n-butyl acrylate/acrylonitrile.
[6] 80/20 n-butyl acrylate/acrylonitrile.

EXAMPLES 15–17

The procedure is repeated using the components and proportions set forth in Example 7 with the exception that instead of the copolymer comprising ethyl acrylate grafted in hydroxyethyl cellulose a graft copolymer of ethyl acrylate on α-cellulose (Example 15); ethyl acrylate on amylose (Example 16); and ethyl acrylate on starch (Example 17) is employed.

The properties of test bars ¼″ x ½″ x 5″ from the blended composition are set forth in Table II.

TABLE II

| Example | 15 | 16 | 17 |
|---|---|---|---|
| Dozi Impact ft. lbs./in. notch | 0.98 | 1.1 | 1.3 |
| Heat distortion 264 p.s.i. ° C | 97 | 99 | 96 |

The invention has been described with particular reference to preferred embodiments thereof and with illustrative examples containing suitable proportions and conditions, but it will be readily apparent that variations may be made in detail by those skilled in the art without departing from the inventive concept provided herein.

We claim:
1. A thermoplastic composition possessing increased impact strength comprising a homogeneous blend of from about 50 to 90 parts by weight of (1) a compound selected from the group consisting of (a) a homopolymer of a compound represented by the general formula

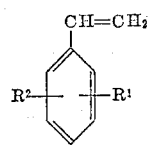

wherein R¹ and R² are selected from the group consisting of hydrogen, lower alkyl radicals of 1 to 4 carbon atoms and chlorine and (b) copolymers thereof with not more than 40% of acrylonitrile, blended with (2) from 50 to 10 parts by weight of a graft copolymer of a monomer selected from the group consisting of ethyl acrylate, n-butyl acrylate, and mixtures thereof with acrylonitrile and a polymer selected from the group consisting of polyvinyl alcohols and polysaccharides.

2. A thermoplastic composition possessing increased impact strength comprising a homogeneous blend of from about 50 to 90 parts by weight of (1) a compound selected from the group consisting of (a) a homopolymer of a compound represented by the general formula

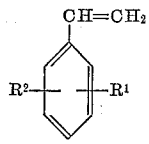

wherein R¹ and R² are selected from the group consisting of hydrogen, lower alkyl radicals, of 1 to 4 carbon atoms and chlorine and (b) copolymers thereof with not more than 40% of acrylonitrile, blended with (2) from 50 to 10 parts by weight of a graft copolymer of a monomer selected from the group consisting of ethyl acrylate, n-butyl acrylate, and mixtures thereof with acrylonitrile and hydroxyethyl cellulose.

3. A thermoplastic composition possessing increased impact strength comprising a homogeneous blend of from about 50 to 90 parts by weight of (1) a compound selected from the group consisting of (a) a homopolymer of a compound represented by the general formula

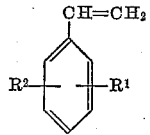

wherein R¹ and R² are selected from the group consisting of hydrogen, lower alkyl radicals of 1 to 4 carbon atoms and chlorine and (b) copolymers thereof with not more than 40% of acrylonitrile, blended with (2) from 50 to 10 parts by weight of a graft copolymer of ethyl acrylate and a polymer selected from the group consisting of polyvinyl alcohols and polysaccharides.

4. A thermoplastic composition possessing increased impact strength comprising a homogeneous blend of from about 50 to 90 parts by weight of (1) a compound selected from the group consisting of (a) a homopolymer of a compound represented by the general formula

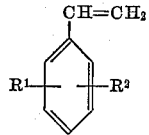

wherein R¹ and R² are selected from the group consisting of hydrogen, lower alkyl radicals of 1 to 4 carbon atoms and chlorine and (b) copolymers thereof with not more than 40% of acrylonitrile, blended with (2) from 50 to 10 parts by weight of a graft copolymer of ethyl acrylate and hydroxyethyl cellulose.

5. A thermoplastic composition possessing increased impact strength comprising a homogeneous blend of from about 50 to 90 parts by weight of (1) a compound selected from the group consisting of (a) a homopolymer of a compound represented by the general formula

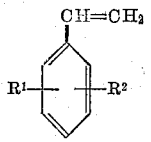

wherein R¹ and R² are selected from the group consisting of hydrogen, lower alkyl radicals of 1 to 4 carbon atoms and chlorine and (b) copolymers thereof with not more than 40% of acrylonitrile, blended with (2) from 50 to 10 parts by weight of a graft copolymer of n-butyl acrylate and a polymer selected from the group consisting of polyvinyl alcohols and polysaccharides.

6. A thermoplastic composition possessing increased impact strength comprising a homogeneous blend of from about 50 to 90 parts by weight of (1) a compound selected from the group consisting of (a) a homopolymer of a compound represented by the general formula

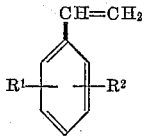

wherein R¹ and R² are selected from the group consisting of hydrogen, lower alkyl radicals of 1 to 4 carbon atoms and chlorine and (b) copolymers thereof with not more than 40% of acrylonitrile, blended with (2) from 50 to 10 parts by weight of a graft copolymer of n-butyl acrylate and hydroxyethyl cellulose.

7. A thermoplastic composition possessing increased impact strength comprising a homogeneous blend of (1) from about 50 to 90 parts by weight of a methyl styrene-acrylonitrile copolymer, in a methyl styrene to acrylonitrile weight ratio of at least 60:40, and (2) from about 50 to 10 parts by weight of a graft copolymer of a monomer mixture of n-butyl acrylate with acrylonitrile and a polymer selected from the group consisting of polyvinyl alcohols and polysaccharides.

8. A thermoplastic composition possessing increased impact strength comprising a homogeneous blend of (1) from about 50 to 90 parts by weight of a methyl styrene-acrylonitrile copolymer, in a methyl styrene to acrylonitrile weight ratio of at least 60:40, and (2) from about 50 to 10 parts by weight of a graft copolymer of a monomer mixture of n-butyl acrylate with acrylonitrile and hydroxyethyl cellulose.

9. A thermoplastic composition possessing increased impact strength comprising a homogeneous blend of (1) from about 50 to 90 parts by weight of a methyl styrene-acrylonitrile copolymer, in a methyl styrene to acrylonitrile weight ratio of at least 60:40, and (2) from about 50 to 10 parts by weight of a graft copolymer of a monomer mixture of n-butyl acrylate with acrylonitrile and starch.

10. A thermoplastic composition possessing increased impact strength comprising a homogeneous blend of (1) from about 50 to 90 parts by weight of a methyl styrene-acrylontrile copolymer, in a methyl styrene to acrylonitrile weight ratio of at least 60:40, and (2) from about 50 to 10 parts by weight of a graft copolymer of a monomer mixture of n-butyl acrylate with acrylonitrile and amylose.

References Cited in the file of this patent
UNITED STATES PATENTS

| | | |
|---|---|---|
| 2,889,308 | Fedderson | June 2, 1959 |
| 2,922,768 | Mino et al. | Jan. 26, 1960 |